May 1, 1923.

B. O. FANSLOW

CHECK WRITER

Filed April 30, 1921    9 Sheets-Sheet 1

1,453,867

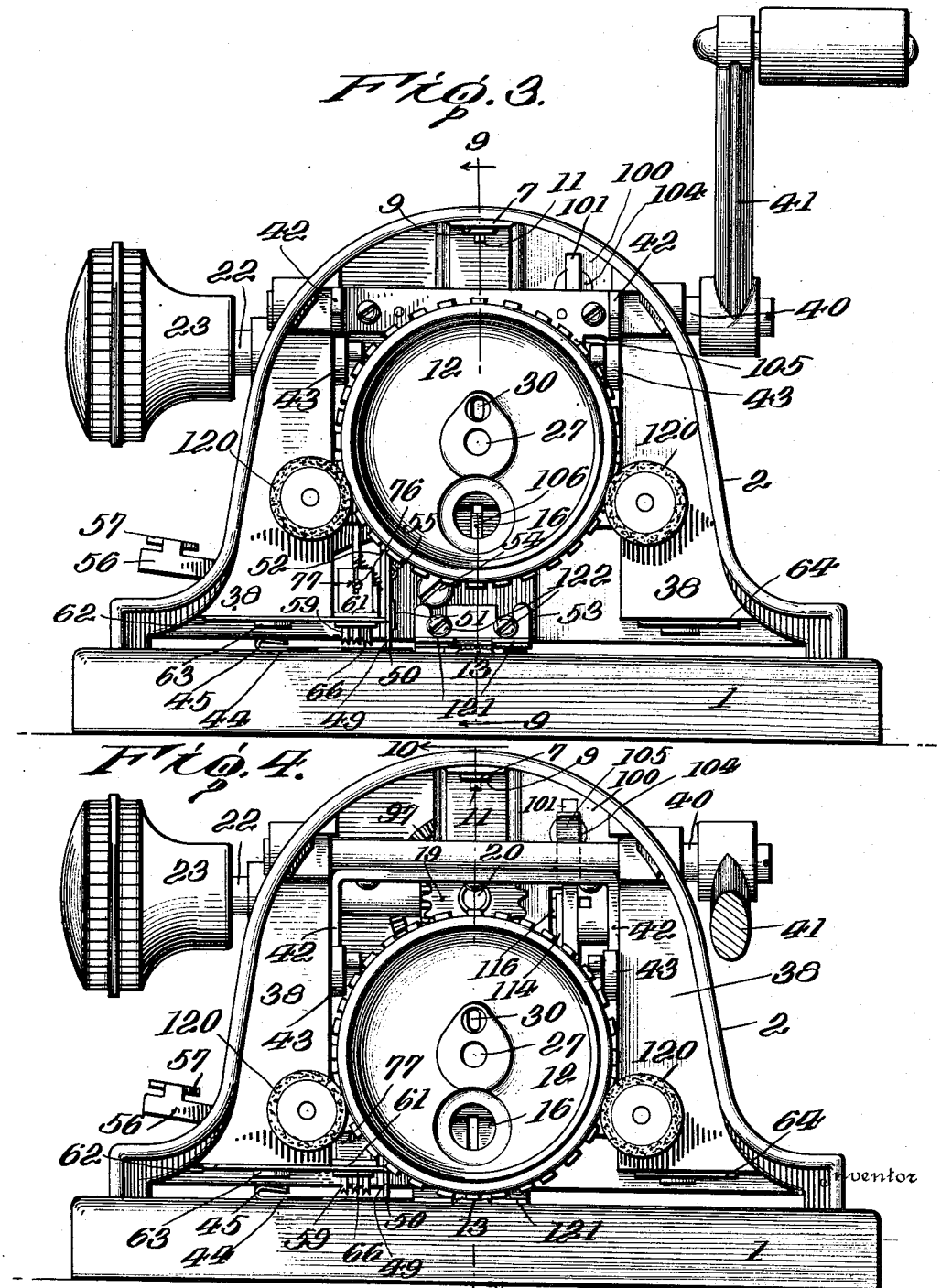

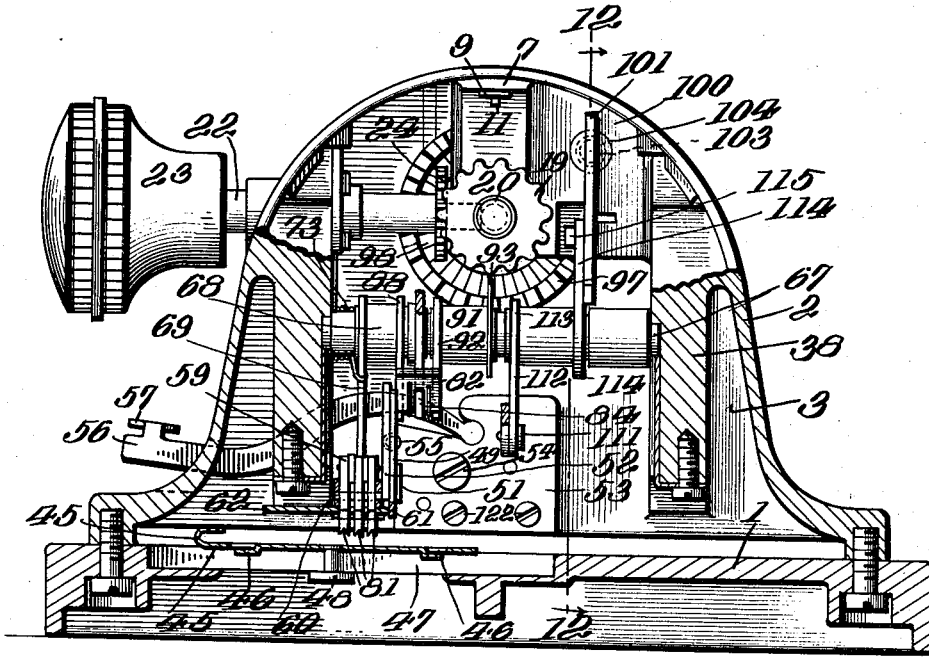
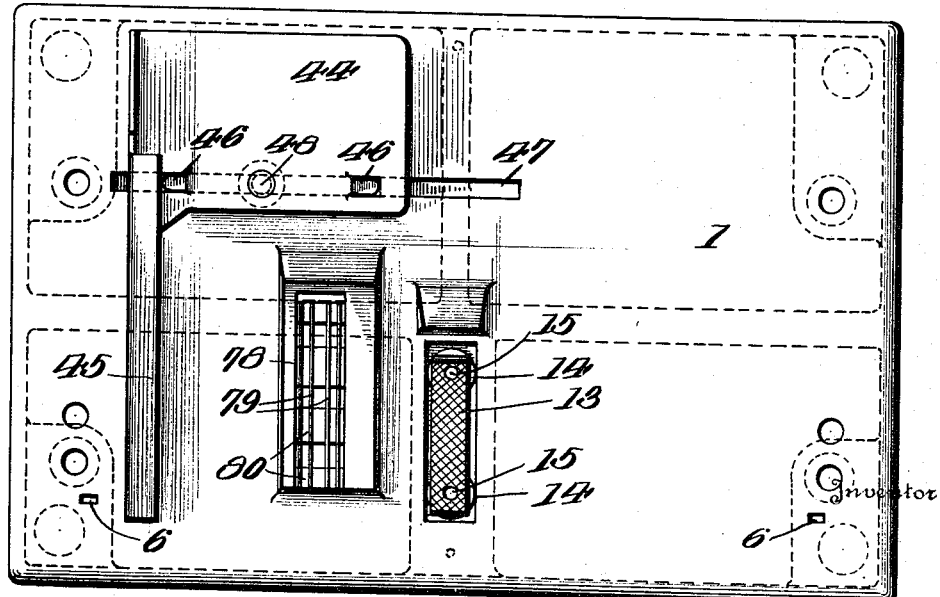

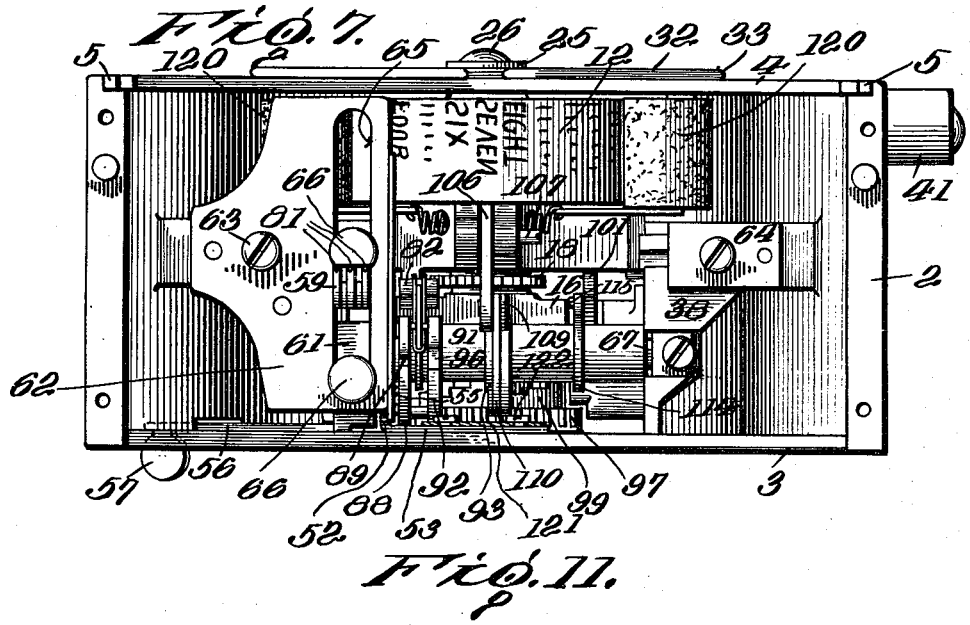

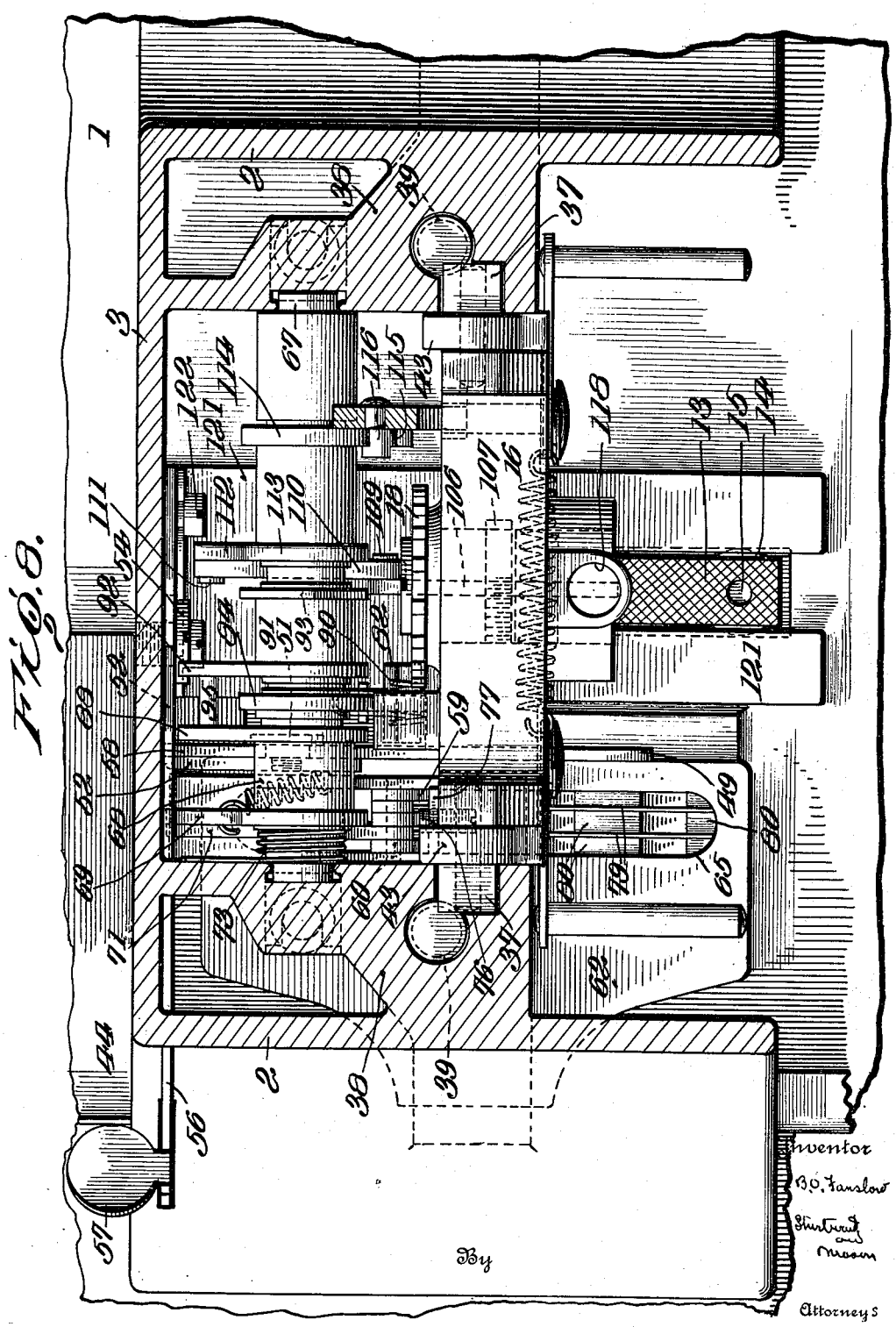

May 1, 1923.

B. O. FANSLOW 1,453,867

CHECK WRITER

Filed April 30, 1921   9 Sheets-Sheet 6

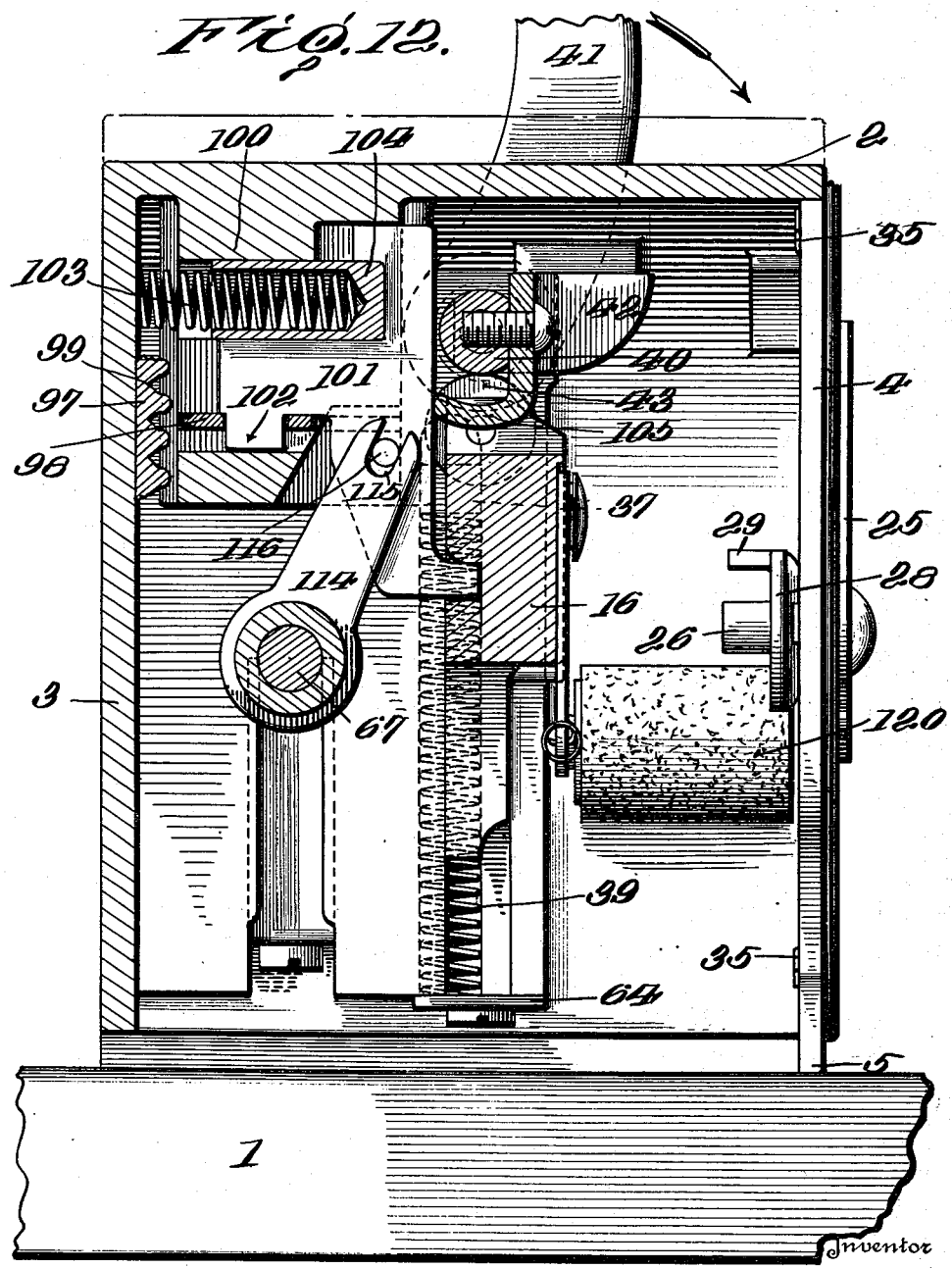

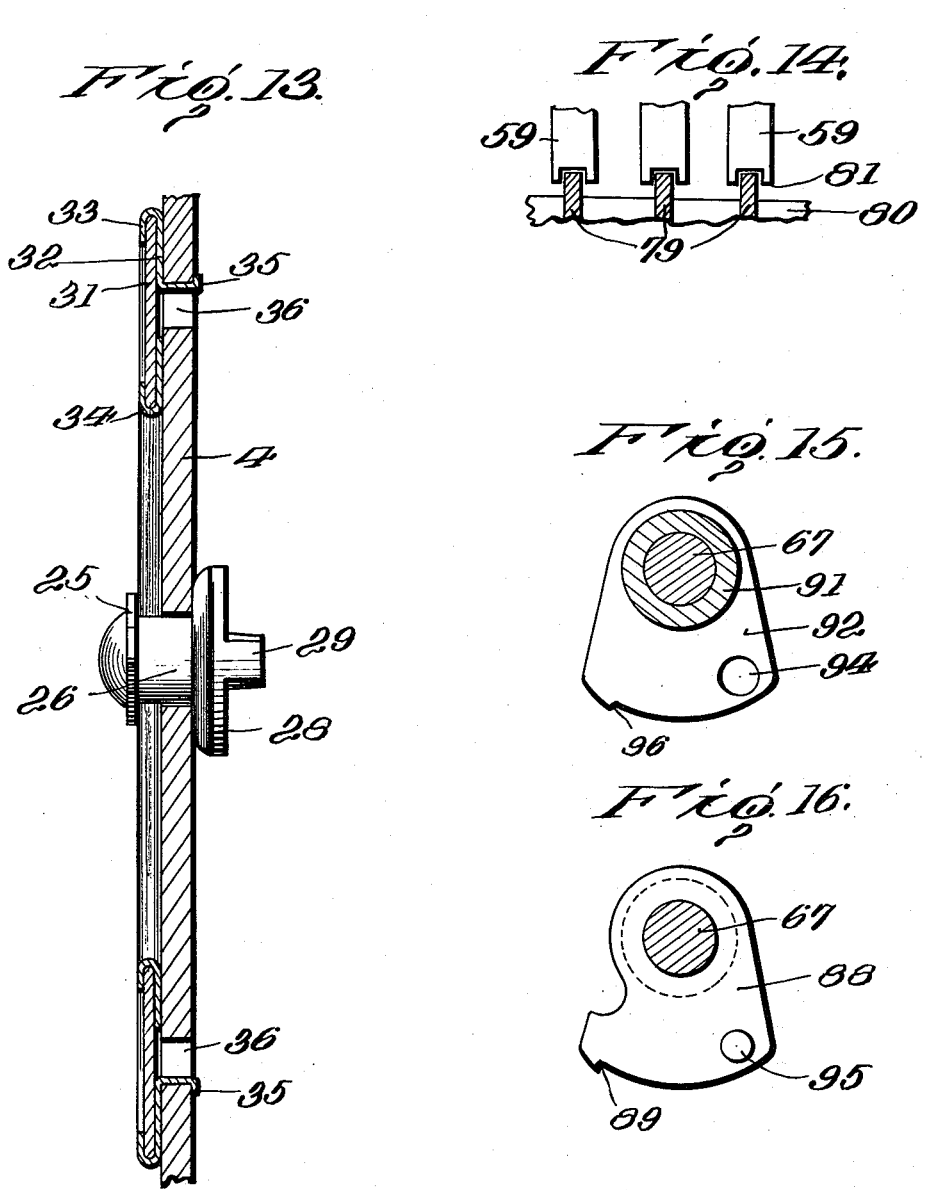

Patented May 1, 1923.

1,453,867

UNITED STATES PATENT OFFICE.

BENJAMIN O. FANSLOW, OF NEW YORK, N. Y., ASSIGNOR TO NEW ERA MANUFACTURING COMPANY, OF NEW YORK, N. Y., A CORPORATION OF NEW YORK.

CHECK WRITER.

Application filed April 30, 1921. Serial No. 465,801.

*To all whom it may concern:*

Be it known that I, BENJAMIN O. FANSLOW, a citizen of the United States, residing at New York city, in the county of New York, and State of New York, have invented certain new and useful Improvements in Check Writers, of which the following is a description, reference being had to the accompanying drawing and to the figures of reference marked thereon.

The invention relates to new and useful improvements in check writers, and more particularly to a check writer having lines of type for printing the amount of the check on the face thereof.

An object of the invention is to provide a check writer having a printing wheel movable relative to a platen and relative to a gage wheel which determines the length of the feed, with means for positively locking the gage wheel prior to any movement of the printing wheel toward the printing position.

Another object of the invention is to provide a check writer having a printing wheel capable of being rotated to bring into printing position the desired lines of type, with means for yieldingly alining the printing wheel for printing the type line selected prior to the operation of a positive locking means which holds the printing wheel in set position during printing.

A further object of the invention is to provide a check writer having a feed dog for feeding the check, with an oscillating pawl which is positively connected with the feed dog for moving the same to feed the check, and wherein said pawl is positively released from connection with the feed dog by the releasing device, the time of releasing thereby being determined by the length of the word printed.

A further object of the invention is to provide a check writer having an enclosed casing for a printing wheel and a feeding mechanism for feeding the check, which casing is provided with a front plate capable of being removed and which is held in place by a yielding latch located within the casing and operable from a point without the casing.

A still further object of the invention is to provide a check writer having an indicating dial for indicating the line of type which is to be printed from, which dial consists of an independent annular member mounted in a supporting frame secured to the outer face of the front plate of the casing.

These and other objects will in part be obvious and will in part be hereinafter more fully disclosed.

In the drawings which show by way of illustration one embodiment of the invention—

Fig. 3 is a view of the check writer from the front and with the front plate removed;

Fig. 4 is a view similar to Fig. 3, but showing the printing wheel as depressed for printing the check;

Fig. 5 is a view, partly in vertical section and partly in front elevation from the front of the machine, said section being in rear of the printing wheel and the sliding cross head which carries the same;

Fig. 6 is a top plan view of the base plate of the machine;

Fig. 7 is a bottom plan view of the machine with the base plate removed;

Fig. 8 is a horizontal sectional view on the line 8—8 of Fig. 10, the printing wheel being removed;

Fig. 11 is a view in vertical section showing the feed dog and the operating mechanism therefor;

Fig. 12 is a vertical sectional view on the line 12—12 of Fig. 5;

Fig. 13 is an enlarged section through the front plate showing the manner of attaching the dial thereto;

Fig. 14 is an enlarged view showing the feed dogs and their idling position on the ribs;

Fig. 15 is a side view of the releasing segment for the feeding mechanism; and

Fig. 16 is a side view of the operating segment for the feed dog.

I have shown my improvements as embodied in a check writer which consists of a supporting base in which is mounted a casing containing the operating parts of the check writer. These parts consist of a printing wheel and a platen. The printing wheel is carried by a cross head which is moved by means of a shaft operated by a crank outside of the casing to bring the printing wheel into printing contact with the check on the platen. The check is fed a distance corresponding to the length of the word which has been printed by the feed dog which reciprocates back and forth. Said feed dog is operated by means of an oscillating pawl which engages positively a notched segment connected by a train of mechanism with the feed dog so that the feed dog is positively operated by the pawl. The pawl is released from connection to the feed dog by a releasing device which is moved with the pawl until stopped by the gage and when the releasing device stops, then the pawl is released from its connection to the feed dog. This gage which controls the releasing device is in the form of a gage wheel geared to the rotating device for turning the printing wheel, and is thus geared to the printing wheel. When, however, the printing wheel is lowered or moved away from its extreme upper position, then the connection between the printing wheel and the setting device therefor is broken, that is, the gear wheels are moved out of mesh. The gage wheel is locked, however, before this disconnection takes place, and the locking of the gage wheel is accomplished by the same shaft which depressed the cross head, but by means which operates first to lock the gage wheel before any movement is imparted to the cross head carrying the printing wheel.

The printing wheel is rotated to bring the desired line of type into printing position by means outside of the casing and independent of the means which moves the cross head up and down. The printing wheel is held with a line of type in alinement for printing by a yielding detent in the form of a spring pressed ball, and this operates to hold the printing wheel until a positive locking means engages the printing wheel and holds it in set position during printing. The positive locking means is operated by a downward movement of the cross head, and does not come into effective operation for locking the wheel until the printing wheel has been disconnected from its setting means. The enclosed casing which carries the operating parts is provided with a removable front plate which is held in position by a yielding latch disposed within the casing and operated by means from without the casing. The dial instead of being directly formed on the front face of the casing, consists of a separate annular plate of celluloid or the like, which is mounted in a frame, which frame in turn is secured to the face of the front plate.

Figure 1:
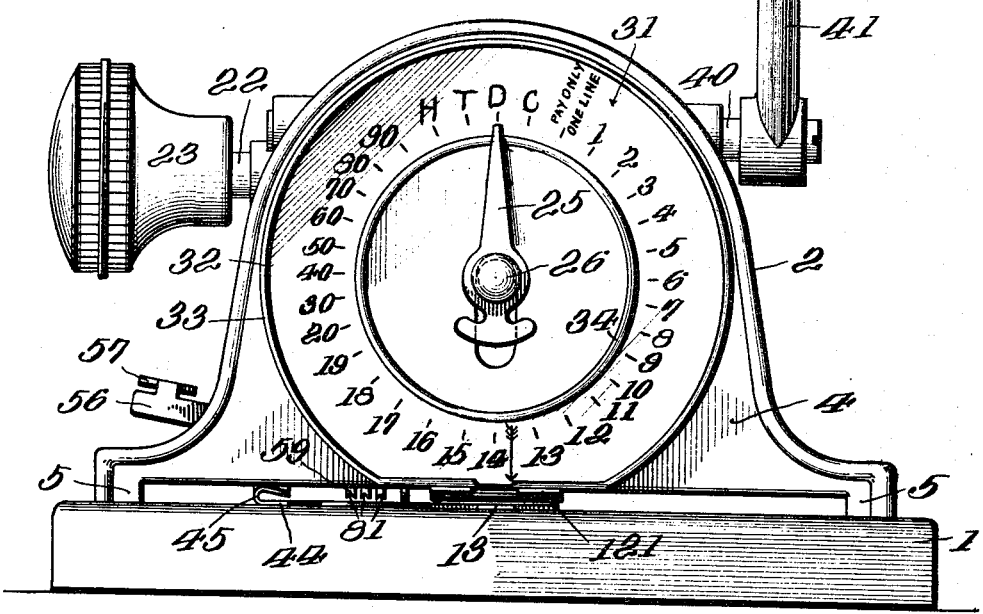
Figure 1 is a front view of a check writer embodying my improvements.
Figure 2:
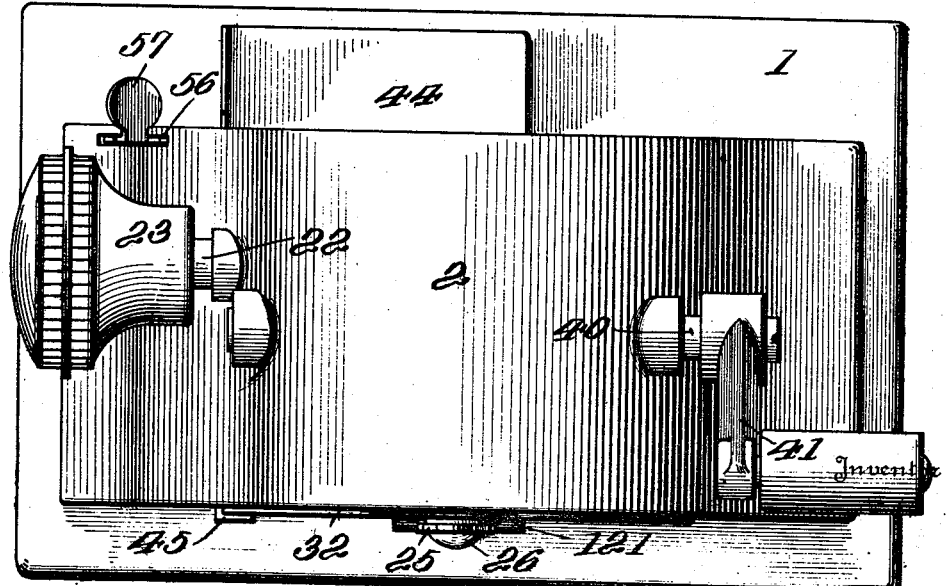
Fig. 2 is a top plan view of the same.
Figure 10:
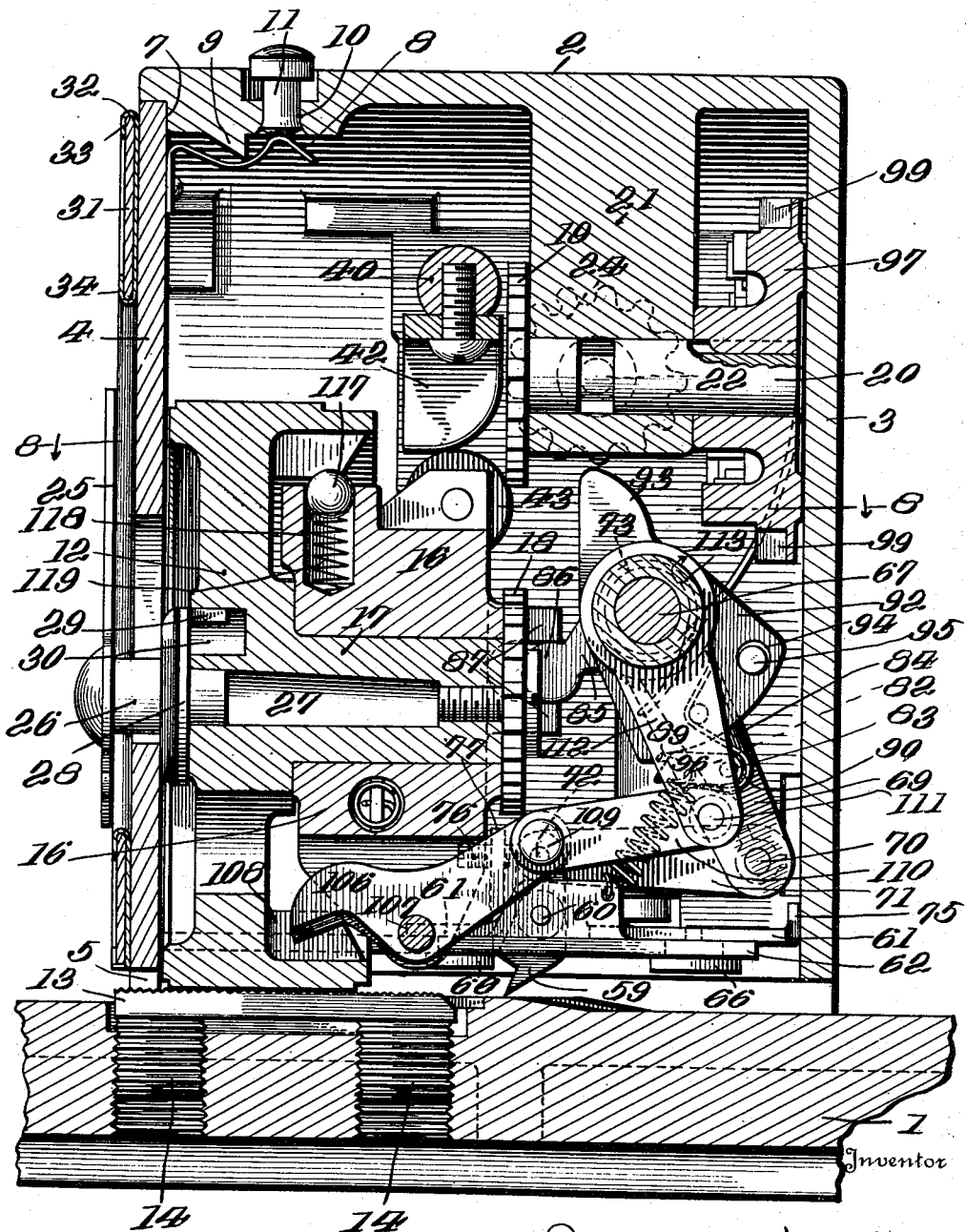
Fig. 10 is a sectional view on the line 10—10 of Fig. 4.

Referring more in detail to the drawings, my improved check writer consists of a supporting base 1 carrying a casing consisting of a curved central portion 2 having an integral back plate 3 and a removable front plate 4. This removable front plate 4 is provided with downwardly extending lugs 5, 5 (see Fig. 1) which engage openings or recesses 6, 6 in the base plate 1 (see Fig. 6). The front plate 4 fits within the curved central portion 2 and bears against a shoulder 7 at the upper part of the casing (see Fig. 10). Said front plate is held in place on the casing by means of a yielding latch 8 secured to the inner face of the front plate and adapted to engage behind the lug 9 on the under wall of the central portion 2. Said central portion 2 of the casing is provided with an opening 10 through which a headed pin 11 extends, and the latch 8 is formed with an upwardly extending shoulder adapted to engage behind the lug 9, and on this shoulder the pin 11 rests. When it is desired to remove the front plate, the pin 11 is depressed. The upper face of the central section 2 is recessed to receive the head of the pin. By this means, I have provided an efficient latch for holding the front plate in place. Said latch may be bent so as to engage firmly behind the lug 9, and may be positively released by depressing the pin 11.

Located within the casing is a printing wheel 12. This printing wheel 12 is provided with lines of type of different lengths which are located on the printing wheel in a direction parallel with the axis of the printing wheel. The printing wheel is adapted to cooperate with a platen 13 carried by the base plate 1 of the machine. Said platen 13 rests on threaded sleeves 14, 14 which engage threaded recesses in the base plate 1 and are held on said threaded sleeves by means of screws 15. By loosening these screws 15, the sleeves 14 may be turned so as to raise and lower the plates and through this adjustment of the platen, it may be brought into proper alinement with the type on the printing wheel, so that a line of type will imprint the check uniformly throughout the entire extent of said line. The printing wheel 12 is mounted on a cross head 16. Said printing wheel is provided with a hub 17 which is journaled on the cross head. On the inner end of the hub and rigidly secured thereto is a gear wheel 18. When the printing wheel is in raised position, said gear wheel 18 meshes with a gear wheel 19. This gear wheel 19 is carried by a shaft 20 mounted in a bearing 21 formed as an integral part of the central portion 2 of the casing. Also mounted in the casing is a cross shaft 22 carrying a hand knob 23 on its outer end by which said shaft may be rotated. Said shaft carries a gear wheel 24 which is continually in mesh with the gear wheel 19. By rotating the hand knob 23, the gear wheel 19 may be rotated, and if the printing wheel is raised and the gear wheel 18 in mesh with the gear wheel 19, then the printing wheel will also be rotated. Thus, through the turning of the knob 23 any desired line of type may be brought into printing position.

The particular line of type which is positioned for printing is indicated by a pointer 25. Said pointer 25 is carried by a short stud 26 adapted to engage and seat in a recess 27 formed centrally of the hub 17 of the printing wheel. Said stud is provided with a circular flange 28 which rests against the front face of the printing wheel and thus holds the pointer slightly spaced from the front of the casing so that it may move freely. This stud 26 frictionally engages and remains seated in the recess 27. Said flange 28 carries a finger 29 which is adapted to engage in a recess 30 in the printing wheel so that the rotations of the printing wheel will positively move the pointer 25.

On the upper face of the front plate 4 there is a circular dial plate 31 preferably formed of celluloid and on this dial plate the characters are placed which indicate in conjunction with the pointer 25 the particular line of type which is set for printing. This circular dial plate is carried by a frame 32 preferably made of light sheet metal. Said sheet metal is bent around the outer edge of the dial plate 31 as indicated at 33. It is also bent around the inner edge of the dial plate as indicated at 34. As clearly indicated in Fig. 13, this sheet metal frame 32 has lugs 35 struck up therefrom at spaced intervals, which lugs extend through openings 36 in the front plate 4, and these lugs are bent against the inner face of the front plate 4 and serve as a means for securing the dial plate in position.

Figure 9:
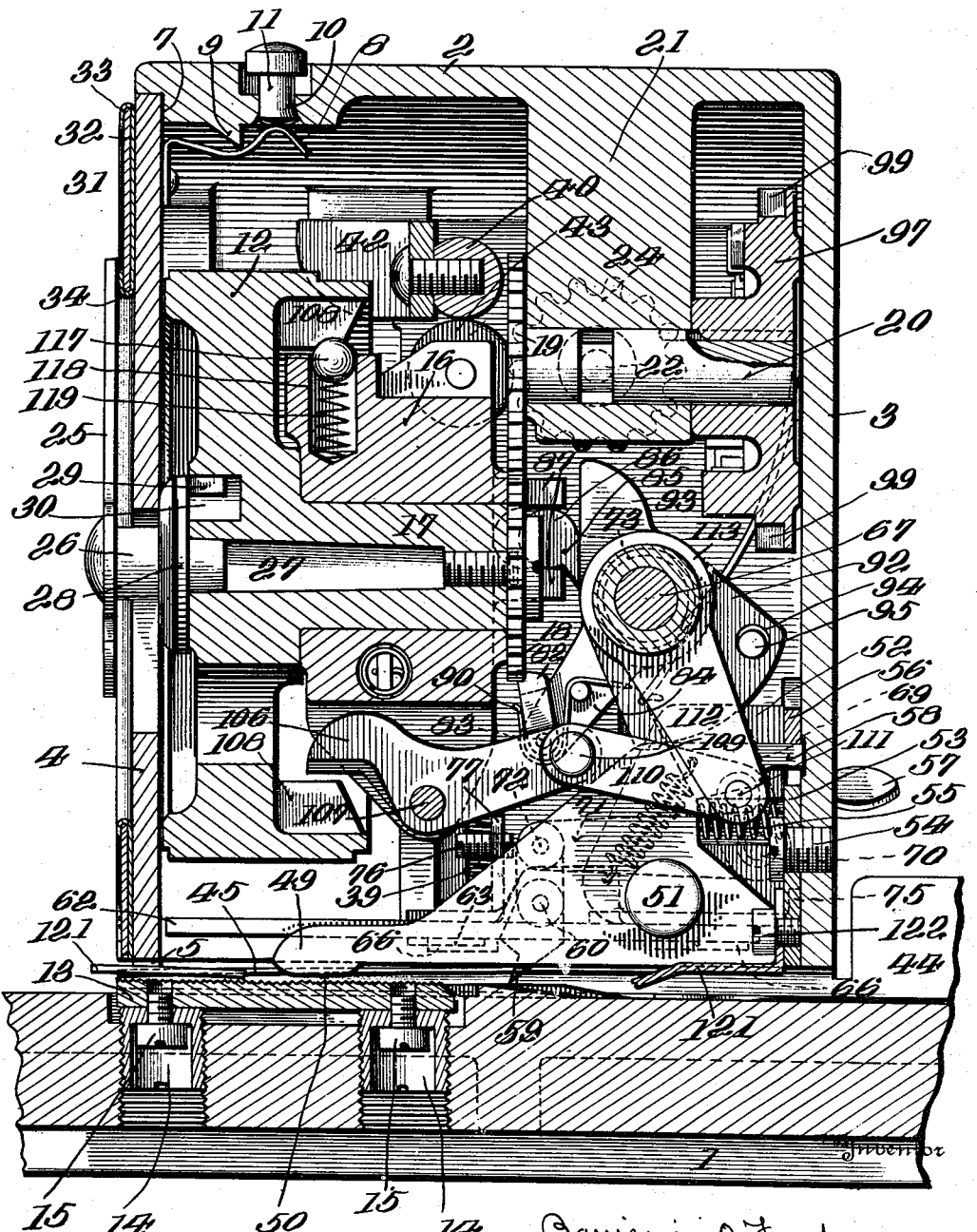
Fig. 9 is a sectional view on the line 9—9 of Fig. 3.

The cross head is provided with laterally extending members 37 which slide in recesses formed in the uprights 38, 38. These uprights 38, 38 are preferably formed integral with the central section of the casing 2. These members 37, 37 rest on the upper ends of springs 39, 39 located in vertical cylindrical recesses in these extensions 38, 38. These springs serve to raise the cross head and hold the printing wheel in elevated position, such as shown in Figures 3 and 9. In this raised position, the gears 18 and 19 are in mesh. The cross head is lowered in order to bring the printing wheel into contact with the check for printing the same by means of a transverse shaft 40. Said shaft 40 is mounted in suitable bearings in the central portion 2 of the casing, and is provided on its outer end outside of the casing with a crank 41 by means of which the shaft may be rotated. Said shaft carries laterally projecting cam ears 42, one at each side of the cross head. The cross head is provided with rollers 43 which are adapted to be engaged by these cam ears 42. When the shaft 40 is rotated to a sufficient extent, the cam ears engage the rollers and force the cross head downwardly against the action of the springs 39. The back plate 3 of the casing and the front plate 4 thereof are both spaced from the bed plate 1 a sufficient distance to allow the check which is to be printed to be inserted underneath these plates. The check is guided and positioned laterally by means of a gage 44. Said gage is in the form of a plate having its side edge turned upwardly and backwardly as indicated at 45 so as to form an overhanging lip underneath which the side edge of the check passes. Said gage plate is provided with downwardly extending ears 46 which engage a recess 47 in the bed plate 1 and a headed stud 48 passing through this recess 47 is riveted to the gage plate and holds the gage plate on the bed plate, but permitting said gage plate to be moved laterally either to the right or the left as viewed in Fig. 6. It will be noted from this figure that the upturned lip portion 45 extends from the main section of the gage plate well toward the front of the machine so as to direct the check as it is being fed.

The check is yieldingly held on the bed plate 1 by means of a presser foot 49. Said presser foot 49 consists of a plate having a rounded downwardly projecting foot portion 50 at its forward end, and said plate is pivoted at 51 to a bracket 52. This bracket is bent at right angles about its forwardly projecting portion as indicated at 53, and said right angled portion is secured to the back plate 3 of the casing by means of screws 54. A spring 55 bearing at one end against this bracket and at its other end against the plate 49, yieldingly forces the foot 50 into contact with the check, and the check against the bed plate of the machine. The presser foot 49 is raised by means of a lever 56. This lever 56 is pivoted at its inner end to the bracket 53 and extends outwardly to a slot in the central portion 2 of the casing, and at its outer end carries a finger piece 57. When this finger piece is depressed, the lever is brought into engagement with the rearwardly projecting arm 58 formed as a part of the presser foot, depresses said arm 58 and as said arm is engaged at a point in rear of the pivotal point 51, the presser foot will be raised.

The check is fed across the bed plate from rear to the front of the casing by means of a feed dog 59. Said feed dog 59 is pivoted at 60 to a sliding carriage 61. This sliding carriage 61 is mounted on a bracket 62 which is secured by means of a screw 63 to one of the standards 38. Said bracket serves as a lower abutment for the spring 39 at the left-hand side of the check writer as viewed from the front thereof. A plate 64 secured to the standard 38 at the right-hand side of the check writer serves as an abutment for the spring 39 at that side of the machine. The bracket 62 is provided with a slot 65. The carriage 61 is provided with two headed studs 66 which are riveted to the carriage and extend through the slot 65 and serve as a means for holding the carriage on the bracket 62 and at the same time permitting said carriage to slide freely back and forth. Extending transversely across the check writer and mounted in suitable bearings in the standards 38, 38 is a shaft 67. Freely mounted to turn on said shaft 67 is a collar 68 which carries a depending arm 69. This depending arm 69 is pivoted at 70 to a link 71, which in turn is pivoted at 72 to the upper end of the feed dog 59. A spring 73 coiled about the shaft 67 bears at one end against said arm 69 and normally moves the arm about the shaft 67 in a counter clockwise direction as viewed in Fig. 11. This action of the spring pulls on the link 71 and this in turn swings the dog 59 until the shoulder 74 engages the carriage and then moves the carriage bodily to the right as viewed in Fig. 11, until the rear end of the carriage which is upturned at 75 strikes the rear plate 3 of the check writer. This is the rearward or non-feeding movement of the feed dog, and the first action is to raise the feed dog from engagement with the check and then move the feed dog rearwardly. When the arm 69 is moved in the other direction, that is, in a clockwise direction about the center of the shaft 67 as viewed in Fig. 11, the feed dog 59 will be swung until the upper end of the feed dog strikes the adjustable stop screw 76 carried by an upwardly extending arm 77 formed as a part of the carriage. As a matter of fact, the carriage is preferably made of sheet metal, and the portion of the metal cut away to form a slot through which the feed dog extends is bent upwardly at right angles to form this arm 77. This forward movement of the link 71 first causes the feed dog to turn on its pivot until the feed dog teeth are caused to engage the check and then the carriage is moved forward carrying the feed dog bodily with it, and feeding the check.

The bed plate is shown as formed with a cut away portion 78 and located in said cut away portion is a series of parallel relatively thin plates 79 which are spaced from each other by blocks 80, thus forming spaced parallel ribs. The feed dog as herein shown is formed in three sections located side by side, and each section has a groove 81 in its lower face (see Fig. 14) which rides on the rib when the feed dog is moved with no check in the machine. At each side of the groove 81, there is a toothed or sharp portion which will grip the check when there is a check in the machine, bending it over the rib to assist in the gripping thereof, and thus the check will be fed just the same distance that the feed dog is moved and this insures accurate spacing of the printed words on the check.

The arm 69 is moved in a clockwise direction as viewed in Fig. 11 by means of an oscillating pawl 82. Said pawl 82 is pivoted at 83 to an arm 84 which is carried by a sleeve mounted freely on the shaft 68. Said sleeve also has a laterally projecting arm 85 carrying a ball shaped end 86 located between spaced lugs 87, 87 on the cross head 16. When the cross head moves up and down, the arm 85 will oscillate the arm 84 carrying the pivoted pawl 82. Rigidly connected to the sleeve 68 is a segment plate 88. This segment plate 88 is provided with a shoulder 89. The pawl 82 is yieldingly pressed by means of a spring 90 against the curved face of the segment 88, and when the pawl is moved in a clockwise direction as viewed in Fig. 11, it will engage the shoulder 89, turn the segment plate 88, and thus swing the arm 69. Mounted on the shaft 67 is a second sleeve 91 which is freely carried by said shaft. This sleeve 91 carries a segment plate 92 which is rigid with the sleeve. Said segment plate 92 has an upwardly extending arm 93 (see Fig. 9). Said segment plate 92 is provided with an opening 94 therethrough into which extends a pin 95 carried by the segment plate 88. Said segment plate 92 is also provided with a shoulder 96. This shoulder 96 is slightly rounded and not as sharp or angular as the shoulder 89. The arm 93 is adapted to make contact with a gage wheel 97, which gage wheel is rigidly fixed to the rear end of the shaft 20. The gage wheel 97 is provided with a series of shoulders or gaging faces, the height of which is proportioned to the particular length of word with which it is associated, plus the distance between words. This gage wheel 97 being rigidly connected to the shaft 20 is connected up to the gear wheel 19 and through the gear wheel 18 is connected with the printing wheel so that when the printing wheel is rotated to bring any selected line of type into printing position, the corresponding gage shoulder will be positioned that the arm 93 will contact therewith.

When the cross head moves downwardly in order to bring the printing wheel into printing contact, the arm 85 moves downwardly and this will retract the pawl 94, moving the same to its extreme rearward position. The feed dog is in its extreme rear position and therefore the segment plates 92 and 88 will be turned to their extreme limit in a counterclockwise direction as viewed in Fig. 11. On the upward movement of the cross head, the arm 85 will be turned in a clockwise direction, and this will carry the pawl 82 forward, causing the same to engage the shoulders 89 and 96. This positively connects the pawl to the feed dog so that the feed dog and the feed dog carriage will be positively moved forward, first the feed dog being caused to engage the check and then bodily move the check forward or lengthwise. When the arm 93 makes contact with the selected shoulder on the gage wheel 97, then the segment plate 92 stops. The pin 95 is of less diameter than the opening 94. The shoulder 96 is rounded so that the retarding of the plate 92 will not stop the forward movement of the pawl 82 nor the forward movement of the plate 88 at just the instant when the plate 92 stops. As this pawl continues onward, the rounded shoulder 96 will swing the pawl outwardly and cause it to be released from the angular shoulder 89. Just as soon as the pawl is released from this angular shoulder 89, the spring 73 comes into action and retracts the feed dog and feed carriage, at the same time moving the segment plates 88 and 92 to their extreme rearward position and the feed dog to its extreme rearward position for its next feed stroke. It will therefore be apparent that the feed dog is moved forward from a fixed extreme position to a position determined by the length of the word printed, plus the distance between the words, and on the upward movement of the cross head after the word has been printed.

The gage wheel 97 must be held in proper timing with the printing wheel, and therefore it has been found necessary to lock this gage wheel before the gears 18 and 19 are moved out of mesh and to hold it locked during this entire period of unmeshing of the gears. This is accomplished by the locking dog 98 which is adapted to engage between radial teeth 99 carried by said wheel 97. Depending from the central portion 2 of the casing is an integral bracket 100. Mounted to slide in a suitable guideway in the bracket is a plate 101. Said plate 101 has a depending lug 102 which extends through an opening in the locking dog 98. Said locking dog 98 also slides in a suitable guiding recess in the bracket 100. The plate 101 is forced to the right as viewed in Fig. 12 so as to disengage the locking dog 98 from the teeth 99 by means of a spring 103. Said spring extends into the sleeve 104, the right-hand end of which is closed, and the sleeve bears against the plate 101. Mounted on the shaft 40 is a cam plate 105 which is constantly in contact with the plate 101. It will be noted that the cam ears 42 are out of contact with the rollers 43. The first part of the forward movement of the hand crank 41 rotates the shaft 40 so as to cause the cam plate 105 to force rearwardly on the plate 101, compressing the spring 103 and causing the locking dog 98 to engage between the teeth on the gage wheel 97 and be fully seated therein and the gage wheel positively locked before the cam ears 42 engage the rollers 43 which starts the downward movement of the cross head. Thus it will be seen that the gage wheel is positively locked before the gear wheel 18 is moved out of mesh, even to the slightest extent, with the gear wheel 19.

It is also essential that the printing wheel shall be positively locked and held in set position during printing. This is accomplished by means of a locking lever 106. Said locking lever 106 is pivoted at 107 to the cross head. The left hand end of the lever as viewed in Fig. 9 is adapted to engage between spaced teeth 108 on the printing wheel. The end of the lever and the space between the teeth is shaped so that when the lever moves between the teeth, it will positively hold the printing wheel from movement and the line of type in set position for printing. The right hand end of the lever 106 is pivoted at 109 to a link 110. This link in turn is pivoted at 111 to an arm 112. The arm 112 is rigid with a sleeve 113 loosely mounted on the shaft 67. An arm 114 is also fixed to this sleeve 113 and said arm 114 extends upwardly and is provided with a fork 115 adapted to engage a pin 116 carried by the sliding plate 101. This pin merely serves as an abutment to prevent the arm 114 from movement. This holds the arm 112 substantially in fixed position so that when the cross head moves downwardly, the bodily movement of the lever 105 through the link 110 will cause said lever to swing on its pivot 107 and engage between the teeth 108.

From the above it will be noted that this locking lever 106 does not immediately engage between the teeth 108. In order to provide temporary means for holding the printing wheel in a set position, I have provided a yielding detent in the form of a spring pressed ball 117 which is located in a recess 118 in the cross head. A spring 119 bearing against the ball forces it outwardly and holds it in contact with the inner faces of the teeth 108. The spring yields and allows the ball to roll over the teeth as the printing wheel is turned through the turning of the hand knob. The ball, however, is of such dimensions as to move part way in between two adjacent teeth 108 and this serves to temporarily aline the type and hold it in such alinement until the positive locking means engages the printing wheel and holds it in set position. Also mounted on the cross head and yieldingly pressed into engagement with the printing wheel, are inking rollers 120. These rollers move up and down with the cross head and continuously contact with the printing wheel.

In order to strip the check from the printing type when the printing wheel is raised, I have provided a yielding plate 121, which is secured by means of a screw 122 to the bracket 53. This plate extends forwardly to the front end of the casing and is slotted at its forward end so as to permit the type to engage the check through said slot. This stripping plate, of course, is at one side of the region wherein the feed dog engages the check for feeding the same. The bed plate is provided with a suitably raised portion in front of the platen and also in front of the ribs on which the feed dog works so as to prevent the front end of the check from striking any obstruction when inserted in the machine, It is thought that the operation of my improved check writer will be obvious from the description which has been given. In general, it may be stated that the presser foot is raised by the operator, the check inserted and properly positioned for the printing of the first word. The presser foot is then lowered. The printing wheel is turned by means of the printing knob to bring the pointer over the first word that it is desired to print, after which the hand lever is swung, and as it is moved forward, it first operates to positively lock the gage wheel, and then it depresses the cross head. As the cross head moves downwardly, the printing wheel is brought into contact with the check and the selected word printed. The printing wheel is temporarily locked by the yielding detent in a set position and is positively locked by the downward movement of the cross head so that at the time of printing, there is no chance of the printing wheel being out of alinement or turning so as to give an improper impression. When the handle is released, the springs raise the cross head, and on this upward movement of the cross head, the oscillating pawl is moved forward and positively connected to the feed dog, causing the feed dog to engage the check and move the check forward. The extent of the forward movement of the feed dog is determined by the gage wheel and the setting of the line of type for printing. The feed dog is disconnected from the oscillating pawl and returns to the rear end of its stroke preparatory to the next feeding action. Other words are likewise printed, and when the desired amount has been printed on the check, the presser foot is raised and the check removed from the machine.

It will be obvious that minor changes in the details of construction and the arrangement of the parts may be made without departing from the spirit of the invention as set forth in the appended claims.

Having thus described the invention, what I claim as new and desire to secure by Letters-Patent, is:—

1. A check writer including in combination, a printing wheel, a platen, means for moving the printing wheel toward and from the platen, a feeding mechanism, a gage wheel, and means for positively locking the gage wheel prior to the movement of the printing wheel toward the platen for printing.

2. A check writer including in combination, a printing wheel, a platen, a feeding mechanism, a gage wheel cooperating with the feeding mechanism, and means for first locking the gage wheel and for subsequently moving the printing wheel into cooperative relation with the platen for printing.

3. A check writer including in combination, a printing wheel, a platen, a feeding mechanism, a gage wheel cooperating with the feeding mechanism, an operating member, and devices actuated thereby for first locking the gage wheel and subsequently moving the printing wheel into cooperative relation with the platen for printing.

4. A check writer including in combination, a printing wheel, a platen, a feeding mechanism, a gage wheel cooperating with the feeding mechanism, a cross shaft, means for actuating the cross shaft, devices carried by the cross shaft and disposed thereon so as to first lock the gage wheel and subsequently move the printing wheel into cooperative relation with the platen for printing.

5. A check writer including in combination, a printing wheel, a feeding mechanism, a gage wheel associated with the feeding mechanism, means for simultaneously rotating the printing wheel and gage wheel, a platen, means for moving the printing wheel away from the rotating means therefor and toward the platen for printing, and devices for locking the gage wheel prior to the movement of the printing wheel toward printing position.

6. A check writer including in combination a vertically reciprocating cross head, a printing wheel carried by the cross head, a gear mounted on the cross head and attached to the printing wheel for rotating the same, a cross shaft having a gear adapted to mesh with the gear on the cross head when the cross head is raised, a gage wheel geared to the cross shaft, means for rotating the cross shaft to simultaneously turn the printing wheel and gage wheel, a platen, and means for locking the gage wheel and subsequently reciprocating the cross head to move the printing wheel toward and from the platen.

7. A check writer including in combination a vertically reciprocating cross head, a printing wheel carried by the cross head, a gear mounted on the cross head and attached to the printing wheel for rotating the same, a cross shaft having a gear adapted to mesh with the gear on the cross head when the cross head is raised, a gage wheel geared to the cross shaft, means for rotating the cross shaft to simultaneously turn the printing wheel and gage wheel, a platen, a second cross shaft, means for oscillating said second cross shaft, a locking dog for engaging and locking the gage wheel, means carried by the second cross shaft for operating said locking means, and devices carried by said second cross shaft for moving said cross head downwardly.

8. A check writer including in combination a vertically reciprocating cross head, a printing wheel carried by the cross head, a gear mounted on the cross head and attached to the printing wheel for rotating the same, a cross shaft having a gear adapted to mesh with the gear on the cross head when the cross head is raised, a gage wheel geared to the cross shaft, means for rotating the cross shaft to simultaneously turn the printing wheel and gage wheel, a platen, a second cross shaft, a crank handle for oscillating the cross shaft, a sliding plate, a locking dog moved thereby and adapted to engage the gage wheel for locking the same, a spring for moving the locking plate to release the gage wheel, a cam carried by the second cross shaft for moving said sliding plate, said spring operating through said cam to raise the crank handle, cams carried by the second cross shaft and engaging the cross head for moving the same downwardly to carry the printing wheel into cooperative relation to the platen, and springs for raising the cross head.

9. A check writer including in combination, a printing wheel, a reciprocating cross head in which the printing wheel is mounted to rotate, means for rotating the printing wheel, said printing wheel having parallel lines of type extending in a direction parallel with its axis, said printing wheel having spaced radial teeth on its inner face, a spring pressed ball carried by the cross head and continuously bearing against said teeth and adapted to seat between the teeth for yieldingly holding the printing wheel in a set position, and a locking lever moved by the cross head for engaging between the teeth to positively hold the printing wheel in set position during printing.

10. A check writer including in combination, an enclosing casing having a removable front plate, a lug on the inner face of said casing, a spring latch for engaging the lug for holding the front plate in position, means actuated from outside of the casing for releasing the latch, a printing wheel located within the casing, a platen cooperating with the printing wheel, means for imparting a relative movement to the printing wheel and platen for printing, said means being operated from the outside of the casing, a feeding mechanism for feeding the check, and a gage wheel for determining the extent of movement of the feeding mechanism.

11. A check writer including in combination, an enclosing casing having a front plate, a printing wheel within the enclosing casing, means for rotating the printing wheel to bring the same into a desired printing position, a pointer attached to the printing wheel, an annular celluloid dial plate, a sheet metal frame bent about the inner and outer edges of the dial plate for supporting the same, said front plate having openings therethrough, and said sheet metal frame having lugs struck up therefrom inserted through said openings and bent to engage the inner face of the front plate for attaching the dial plate thereto.

12. A check writer including in combination, a bed plate, an enclosing casing mounted thereon, a printing wheel, a gage wheel, and a feeding mechanism located within said casing, said front plate having depending lugs at its outer side edges, openings in the base plate adapted to receive said lugs, a spring latch carried by the front plate, a lug carried by the casing at the inner face thereof and adapted to be engaged by said latch to hold the front plate in place, and a headed pin extending through said casing and positioned to engage said latch for detaching the same from said lug.

13. A check writer including in combination, a printing wheel, a platen, means for imparting a relative movement to the printing wheel and platen, a feeding mechanism for feeding the check comprising a reciprocating feed dog having a plurality of work engaging sections, each section having a groove in its under face, said bed plate having a plurality of spaced ribs adapted to run in the groove of the feed dog, and support the feed dog when said dog is idling with no check in the machine.

14. A check writer including in combination, a printing wheel, a platen, means for imparting a relative movement to the printing wheel and platen, and a feeding mechanism including a reciprocating feed dog, a carriage on which said feed dog is pivotally mounted, a link pivoted to the upper end of the feed dog, and disposed so as to move the feed dog to throw the point thereof downwardly into engagement with the check prior to the movement of the carriage for the feeding movement of the dog.

15. A check writer including in combination a printing wheel, a platen, means for imparting a relative movement to the printing wheel and plate, a feeding mechanism including a reciprocating feed dog, a carriage on which said feed dog is pivotally mounted, a link pivoted to the upper end of the feed dog, and disposed so as to move the feed dog to throw the point thereof downwardly into engagement with the check prior to the movement of the carriage for the feeding movement of the dog, and an adjustable screw for limiting the swinging movement of the feed dog, said screw acting as an abutment for the link so that the forward movement of the carriage is imparted thereto by the link.

16. A check writer including in combination, an enclosing casing, a reciprocating cross head located within the casing, a printing wheel carried by the cross head, a bracket carried by the casing, a carriage mounted on the bracket, a feed dog pivoted to the carriage, a link pivoted to the upper end of the feed dog and adapted on forward movement to swing the feed dog so as to cause the same to engage the check, a stop screw for limiting the movement of the feed dog, means for positively moving the link forwardly, and a spring for retracting the link.

17. A check writer including in combination, an enclosing casing, a reciprocating cross head located within the casing, a printing wheel carried by the cross head, a bracket carried by the casing, a carriage mounted on the bracket, a feed dog pivoted to the carriage, a link pivoted to the upper end of the feed dog and adapted on forward movement to swing the feed dog so as to cause the same to engage the check, a stop screw for limiting the movement of the feed dog, means for positively moving the link forwardly, a spring for retracting the link, a yielding presser foot under which the check is fed, and means outside of said casing for lifting the presser foot.

18. A check writer including in combination, a reciprocating feed dog, a cross head movable up and down, a printing wheel carried by the cross head, a pawl oscillated by the cross head through a fixed distance at each reciprocation of the cross head, a segment having a shoulder formed therein connected to said feed dog and disposed so that said pawl engages said shoulder for positively moving the feed dog forward, a gage wheel, a second segment associated with the first-named segment and having an arm adapted to engage said gage wheel, said second segment having a rounded shoulder lying in the path of movement of the pawl, said rounded shoulder operating when said segment carrying the same is stopped by the gage wheel to lift the pawl to release its connection with the feed dog, and a spring for retracting the feed dog.

19. A check writer including in combination, a reciprocating cross head, a printing wheel carried thereby, a reciprocating feed dog, a segment having a shoulder, an arm connected to the feed dog, a second segment associated with the first-named segment, a pin carried by the first-named segment and extending into the opening in the second-named segment, said opening being slightly larger than the pin, said second-named segment having a rounded shoulder arranged alongside of the shoulder of the segment connected with the feed dog, a yielding pawl oscillated by the cross head and adapted to engage said shoulders for positively moving the feed dog forward, a spring for retracting the feed dog, a gage wheel, an arm connected to the segment having the rounded shoulder for stopping the movement of said last-named segment according to the length of the word that is printed, said rounded shoulder operating when the segment stops to release the pawl from the segment connected to the feed dog and thereby determine the length of the feed stroke.

In testimony whereof I affix my signature.

BENJAMIN O. FANSLOW.